United States Patent [19]

Stevenson, III

[11] 4,321,862

[45] Mar. 30, 1982

[54] METHOD AND APPARATUS FOR TREATING FOODSTUFFS WITH LIQUID

[76] Inventor: William H. Stevenson, III, Rte. 5, Box 532, Travelers Rest, Easton, Md. 21601

[21] Appl. No.: 74,556

[22] Filed: Sep. 11, 1979

[51] Int. Cl.³ .............................................. A23B 4/06
[52] U.S. Cl. ..................................... 99/468; 99/472; 99/486; 99/517; 99/536; 210/360.1
[58] Field of Search .................. 99/516, 359, 517, 403, 99/536, 468, 487, 472, 486, 511; 426/314, 643, 506; 34/51, 74; 210/360.1

[56] References Cited

U.S. PATENT DOCUMENTS

| | | | |
|---|---|---|---|
| 498,488 | 5/1893 | Power | 99/511 |
| 1,016,291 | 2/1912 | Robinson | 99/511 |
| 1,259,410 | 3/1918 | Kapadia | 99/517 |
| 3,760,716 | 9/1973 | Stevenson | 99/536 |
| 3,859,450 | 1/1975 | Alsina | 426/643 |
| 4,212,889 | 7/1980 | Fuentevilla | 426/643 |

Primary Examiner—Philip R. Coe
Assistant Examiner—Timothy F. Simone
Attorney, Agent, or Firm—Roylance, Abrams, Berdo & Farley

[57] ABSTRACT

Batch method and apparatus for treating foodstuffs, especially dried proteinaceous products such as shrimp, with a liquid, especially with an aqueous rehydration medium under automatically controlled conditions of temperature, pressure and time.

8 Claims, 4 Drawing Figures

METHOD AND APPARATUS FOR TREATING FOODSTUFFS WITH LIQUID

This invention relates to treatment of foodstuffs with liquids and particularly to apparatus for batch treatment of foodstuffs, especially dried proteinaceous foodstuffs, with liquid media, especially aqueous rehydrating media. The invention includes, as an especially advantageous embodiment, an improved batch method for rehydrating dried shrimp.

BACKGROUND OF THE INVENTION

Though prior art workers have given much attention to preliminary treatment of foodstuffs, and particularly to such treatments as drying, less work has been done in the area of liquid treatments of the type necessary to accomplish rehydration. Thus, the workers in the food art have long been able to dry, and especially freeze dry, proteinaceous foodstuffs such as shrimp, but the problem of rehydration has usually been left to the ultimate customer and has largely centered on what might be termed kitchen methods. As a result, the market for freeze dried products, for example, has tended to be limited to applications where the dried product is to be cooked by the customer and the deficiencies of rehydration are thus masked. Only in recent times, as exemplified by my prior U.S. Pat. Nos. 3,760,716, issued Sept. 25, 1973, and 3,804,959, issued Apr. 16, 1974, has attention begun to be focused on the problems of liquid treatments of the type involved in rehydrating freeze dried foodstuffs.

If freeze drying of foodstuffs such as shrimp is to become a viable preparatory method, it is necessary that rehydration methods and apparatus be provided which can be employed at each market center and will produce a rehydrated product which is organoleptically similar to the fresh foodstuff. The fact that the rehydrated product is ordinarily handled as if the product were fresh tends to minimize the size of rehydration plants. While my earlier U.S. Pat. No. 3,760,716 provides rehydration apparatus useful when the rehydration plant is to have a relatively large output, no completely satisfactory method and apparatus suitable for relatively small market areas has heretofore been provided.

OBJECTS OF THE INVENTION

A general object of the invention is to provide a method and apparatus suitable for batch treatment of foodstuffs with liquid, and particularly for batch rehydration of dried proteinaceous foods such as shrimp.

Another object is to devise such an apparatus which will make it economical to treat relatively small batch quantities of foodstuffs with liquid when conditions of temperature and pressure are important factors.

A further object is to provide such a batch treatment apparatus which conserves the treating liquid and minimizes equipment and operating costs.

Yet another object is to devise such an apparatus whereby, after treatment of the foodstuff with the liquid, residual free liquid can be removed from the treated foodstuff by applying centrifugal force to the foodstuff while the foodstuff is still in the treatment zone.

SUMMARY OF THE INVENTION

Apparatus according to the invention comprises a holding tank for the liquid with which the foodstuff is to be treated; refrigeration means for maintaining the liquid in the holding tank within a desired temperature range; a sealed treating chamber in which a quantity of the foodstuff can be supported for treatment and withdrawn after treatment; first conduit means connected between the holding tank and the treating chamber via which liquid can be delivered from the holding tank to the treating chamber and returned from the treating chamber to the holding tank; pump means capable of operating in a vacuum pump mode and a compressor mode; second conduit means connected between the pump means and the treating chamber so that the pump means in its vacuum pump mode can operate to evacuate the treating chamber and thereby reduce the pressure in that chamber; third conduit means connected between the pump means and the treating chamber via which the pump means operating in its compressor mode can pressurize the treating chamber; first valve means connected to control liquid flow in the first conduit means; second valve means connected to control air flow in the second conduit means; third valve means connected to control air flow in the third conduit means; and automatic control means connected to operate the pump means and the valve means to accomplish a first cycle of operation, in which the treating chamber is evacuated and liquid therefore flows from the holding tank into the treating chamber under the influence of the pressure differential between the holding tank and the evacuated treating chamber and the treating chamber is then held under subatmospheric pressure; a second cycle in which the pump means pressurizes the treating chamber and a positive pressure is then maintained in the treating chamber; and a third cycle in which liquid flows from the treating chamber under influence of the positive pressure.

IDENTIFICATION OF THE DRAWINGS

In order that the manner in which the foregoing and other objects are attained can be understood in detail, method and apparatus embodiments of the invention will be described with reference to the accompanying drawings, which form part of the original disclosure of this application, and wherein.

APPARATUS EMBODIMENT OF FIGS. 1-4

Figure 1:
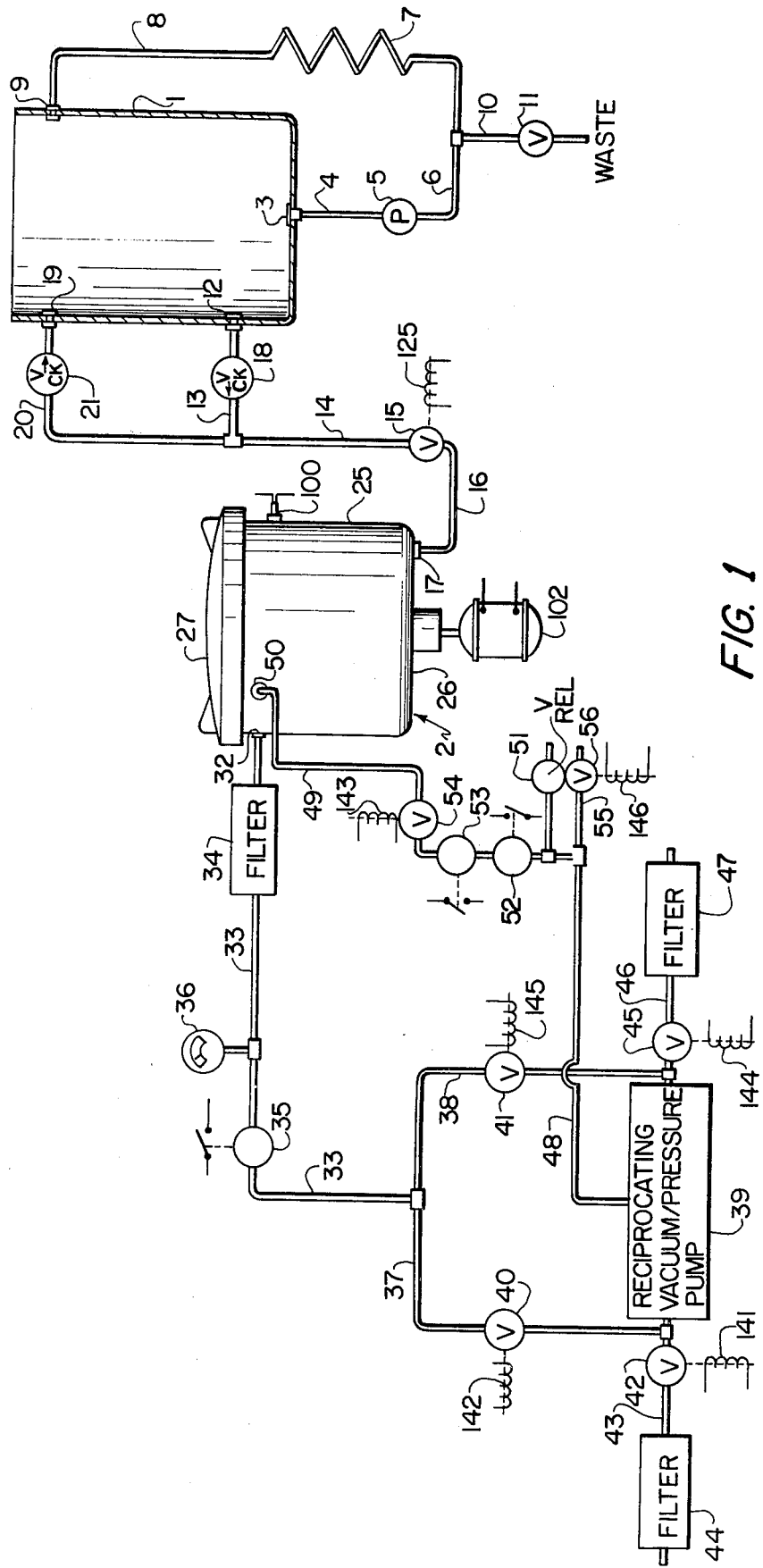
FIG. 1 is a schematic piping diagram of a treatment apparatus according to one embodiment of the invention.

The apparatus embodiment of the invention illustrated in FIGS. 1-4 will be described first in order to simplify description of the method. Commencing with the piping diagram of FIG. 1, it will be seen that the apparatus comprises an open-top holding tank 1 and a treating vessel 2, tank 1 being sized to accommodate a quantity of liquid significantly larger than that quantity to be introduced into vessel 2. Tank 1 is equipped with a central bottom drain 3 connected via conduit 4 to the inlet of an electrically driven pump 5. The outlet of pump 5 is connected via conduit 6 to the heat exchange coil 7 of a conventional refrigeration unit, including an electric motor-driven compressor (not shown) for cooling liquid passed through coil 7. The remaining end of coil 7 is connected via conduit 8 to an inlet fitting 9 near the top of tank 1. A discharge conduit 10, equipped with a manual valve 11, is connected to conduit 6 between pump 5 and coil 7.

Tank 1 is also equipped with an outlet fitting 12 which is spaced a significant distance above the bottom of the tank, the location of fitting 12 being such that, when the liquid level in tank 1 is pulled down to fitting 12, there is enough liquid remaining in the tank for continued cooling by the action of pump 5 in passing the liquid through coil 7. Outlet 12 is connected via conduit 13, conduit 14, normally closed electro-magnetically operated valve 15 and conduit 16 to a fitting 17 which provides a combined inlet and outlet port in the bottom wall of vessel 2. A check valve 18 is interposed in conduit 13 and is oriented to pass liquid from tank 1 but prevent flow in the opposite direction. Tank 1 is also equipped with an inlet fitting 19 located near the top of the tank and connected by conduit 20 to conduit 14. A check valve 21 is connected in conduit 20 and oriented to pass liquid into tank 1 but prevent flow in the opposite direction.

Figure 3:
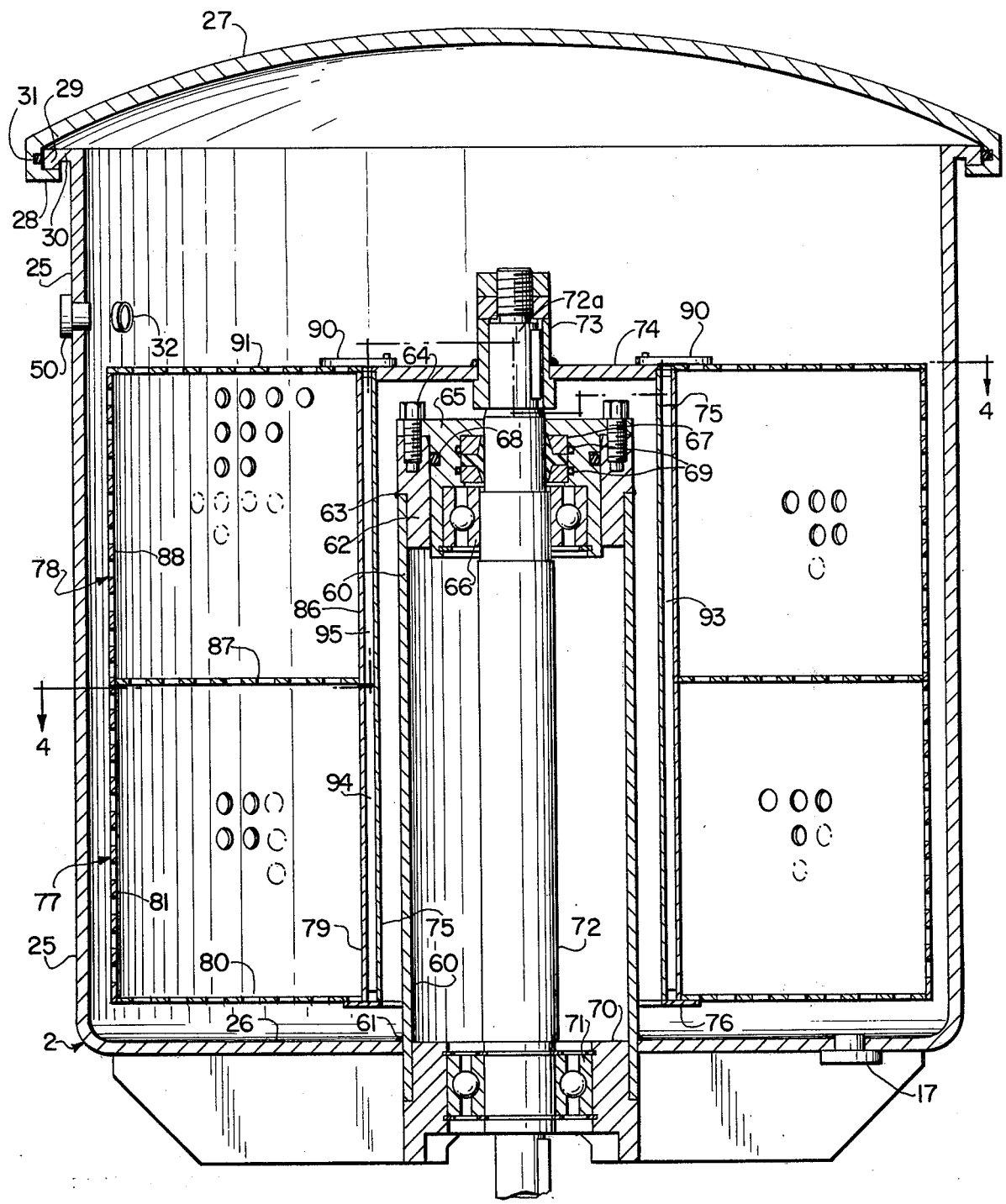
FIG. 3 is a vertical sectional view of a combined pressure vessel and centrifuge employed in the apparatus of FIG. 1.
Figure 4:
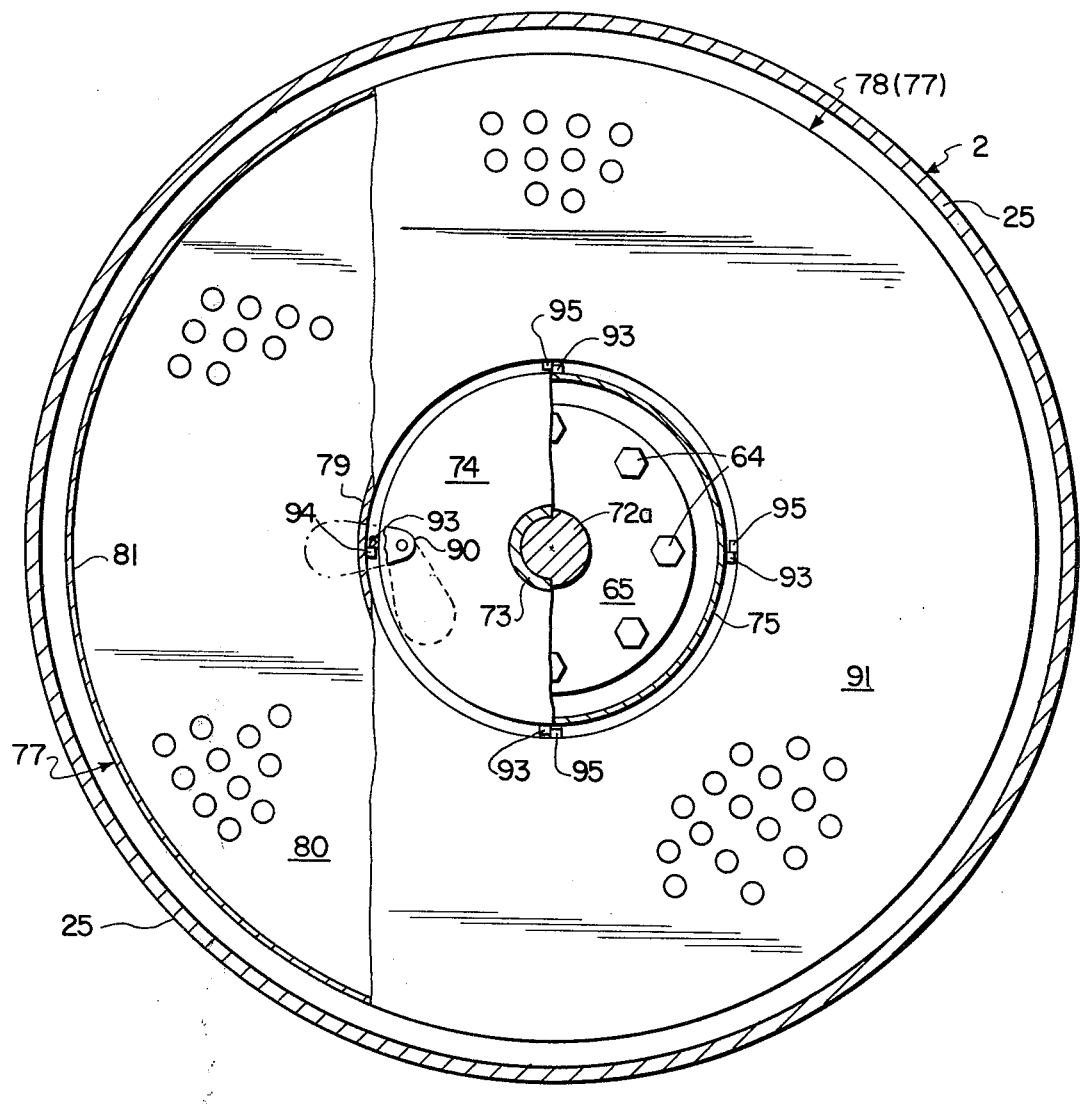
FIG. 4 is a transverse sectional view taken generally on line 4—4, FIG. 3.

As seen in FIG. 3, vessel 2 comprises an upright cylindrical side wall 25 and a flat bottom wall 26. Side wall 25 defines an open top, through which the quantity of food-stuff to be treated can be introduced and withdrawn, the open top being closed by a cover 27 having dependent and inwardly projecting camming members 28 engageable beneath lateraly projecting ears 29 carried by an outwardly projecting transverse annular flange 30 at the top of side wall 25. The peripheral portion of cover 27 is grooved to accommodate a sealing ring 31 to engage and seal against the periphery of flange 30 so that, when the cover is installed, a fluid-tight seal is established between the cover and side wall 25.

Immediately below flange 30, side wall 25 is provided with a fitting 32 forming a port via which the treating chamber defined by vessel 2 can be evacuated. Fitting 32 is connected by conduit 33 to the series combination of filter 34 and a conventional pressure responsive switch 35 adapted to respond to the pressure within conduit 33 and close a normally open set of switch contacts when that pressure has been reduced to a predetermined value. A pressure gauge 36 is connected to conduit 33 between filter 34 and pressure responsive switch 35 so that, when vessel 2 is being evacuated, the pressure in the vessel can be observed. Conduit 33 is connected, by two conduits 37 and 38 in parallel, to the two inlets of a conventional reciprocatory pump 39 capable of operating in a vacumn pump mode and a compressor mode. A normally open electromagnetically operated valve 40 is connected in conduit 37 and a second normally open electromagnetically operated valve 41 is connected in conduit 38. The inlet of pump 39 to which conduit 37 is connected is also connected to the atmosphere via a normally closed electromagnetically operated valve 42, conduit 43 and filter 44. Similarly, the inlet of pump 39 to which conduit 38 is connected is also connected to the atmosphere via a normally closed electromagnetically operated valve 45, conduit 46 and filter 47. The single outlet of pump 39 is connected via conduits 48, 49 to a fitting 50 in the side wall of vessel 2 immediately adjacent fitting 32. A pressure relief valve 51 is connected to conduit 48. The series combination of a pressure responsive switch 52, a pressure responsive switch 53, and a normally closed electromagnetically operated valve 54 is connected in conduit 49. Pressure switches 52, 53 have normally open sets of switch contacts, switch 52 being adapted to close its contacts in response to a predetermined higher pressure in conduit 49 and switch 53 being adapted to close its contacts in response to a predetermined lower pressure in conduit 49. A discharge conduit 55 is connected to conduit 48 between relief valve 51 and pump 39, and a normally open electromagnetically operated valve 56 is connected in discharge conduit 55.

Bottom wall 26 of vessel 2 has a center circular opening through which an upright right cylindrical tubular support member 60 extends, member 60 being rigidly secured to bottom wall 26 by a continuous weld, indicated at 61, the weld forming a fluid-tight seal between member 60 and bottom wall 26. Member 60 projects upwardly within vessel 2 and, at its upper end, embraces a support collar 62, member 60 being fixed to collar 62 by a continuous weld at 63, the weld forming a fluid-tight seal between the tubular member and collar. Secured to collar 62, as by screws 64, is a flanged support sleeve 65 which supports an upper ball bearing 66 and a conventional rotary shaft seal 67. A fluid-tight seal is established between collar 62 and sleeve 65 by an O-ring at 68. Similarly, O-rings at 69 provide a fluid-tight seal between support sleeve 65 and shaft seal 67. At its lower end, tubular member 60 embraces and is secured rigidly to a support collar 70 which supports a ball bearing 71. A drive shaft 72 extends coaxially through member 60 and is journalled in bearings 66, 71 and retained conventionally by the retainers of bearing 71 which engage in cooperating grooves in the shaft. Immediately above bearing 66, shaft 72 is sealingly engaged by shaft seal 67.

End portion 72a of shaft 72 projects above the upper end face of support sleeve 65 and is embraced by and keyed to a hub 73 to which is welded a transverse support disc 74. Disc 74 is flat and circular, the diameter of the disc being significantly larger than that of support member 60. A tubular support member 75 depends from disc 74, the upper end of member 75 embracing the periphery of the disc and being secured rigidly thereto, as by a continuous weld. Member 75 is spaced outwardly from and concentric with member 60 so that the combination of hub 73, disc 74 and member 75 is free to rotate relative to member 60 when shaft 72 is driven. A flat transverse annular outwardly projecting flange 76 is welded to the lower end of tubular member 75.

The quantity of foodstuff to be treated is contained in two annular centrifuge baskets 77 and 78, FIG. 3, which surround member 75 and are supported by flange 76. Lower basket 77 comprises an imperforate right cylindrical inner wall 79, a flat annular bottom wall 80 and a tight cylindrical outer wall 81. Walls 79–81 are of stainless steel sheet, walls 80, 81 being perforated for free passage of liquid therethrough. The inner and outer edges of bottom wall 80 are secured respectively to the lower edge portions of walls 79 and 81, as by welding. Upper basket 78 is identical to basket 77 and comprises imperforate inner wall 86, perforated bottom wall 87 and perforated outer wall 88. A cover member 91 is provided in the form of a flat annular disc of perforated metal, the inner diameter being slightly larger than member 75, the outer diameter being at least as great as that of outer wall 88 of basket 78. Accordingly, cover member 91 can be dropped into place to be supported by the coplanar upper edges of walls 86 and 87. The dimensions of member 75 and baskets 77, 78 are such that, when both baskets are in place and cover member 91 is applied to basket 78, the upper face of cover member 91 is approximately coplanar with the upper face of disc 74. Cover member 91 is retained by two hold-down members 90 pivotally mounted on disc 74 so as to swing about vertical axes between inactive positions, in which the hold-down members do not project beyond the periphery of disc 74, and operative positions, in which the hold-down members overlie and retain cover member 91.

Inner walls 79 and 86 of the baskets have an inner diameter slightly larger than the outer diameter of support member 75 but substantially smaller than the outer diameter of flange 76. Accordingly, basket 77 can be installed by centering the basket above disc 74 and then lowering the basket until the inner peripheral portion of bottom wall 80 and the bottom edge of inner wall 79 seat on flange 76. Upper basket 78 can then be similarly installed, with bottom wall 87 seating on walls 79, 81. To provide a driving connection between tubular member 75 and the baskets, a plurality of circumferentially spaced longitudinally extending splines 93 are rigidly secured to the outer surface of member 75, a like number of circumferentially spaced longitudinally extending splines 94 are rigidly secured to the concave surface of wall 79 of basket 77, and splines 95 are rigidly secured to the concave surface of wall 86 of basket 78, the dimensions being such that walls 79, 86 loosely embrace splines 93 when the baskets are installed.

Figure 2:
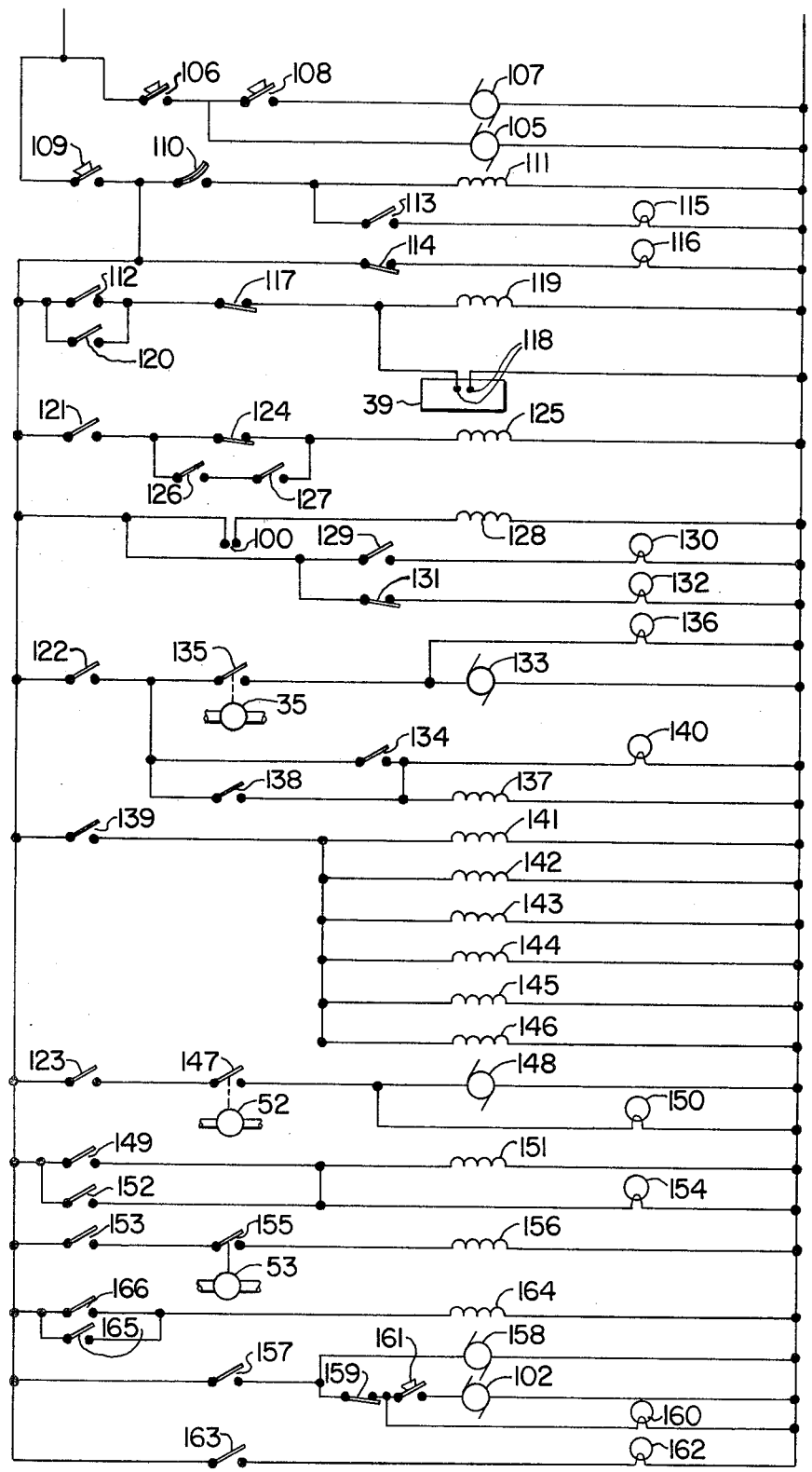
FIG. 2 is a schematic electrical diagram of the apparatus of FIG. 1.

Vessel 2 is equipped with a conventional liquid level sensing probe 100, FIGS. 2 and 3, of the type in which a conductive element of the probe is connected to ground by the electrically conductive treating liquid when the liquid is at the desired level. Level sensing probe 100 is installed in a port in side wall 25 of vessel 2 in a location such that, when the liquid in the vessel contacts the probe, the level is above basket cover 91 (with both baskets 77, 78 in place). Fittings 32 and 50 are located significantly above probe 100 so that the liquid level in vessel 2 is always below the ports provided by fittings 32 and 50.

A conventional shaft coupling 101, FIG. 3, connects the lower end of shaft 72 to a suitable rotary power device, such as electric motor 102, FIG. 1.

Referring now to FIG. 2 for details of the electrical control system employed in the apparatus of FIG. 1, it will be seen that the electric motor 105 of circulating pump 5 can be energized by closing manual switch 106 and that, with switch 106 closed, the compressor motor 107 (not shown in FIG. 2) for the refrigerator can be energized by closing manual switch 108.

A main treatment cycle switch 109 must be closed manually to allow energization of the remainder of the control system. Switch 109 is connected in series combination with a temperature responsive switch 110 and the actuating winding 111 of a relay having normally open contacts 112 and 113 and normally closed contacts 114. Normally open, switch 110 is operative to close when the liquid in tank 1 has been cooled to a predetermined temperature. Thus, if the liquid in the tank is at or below that temperature, manual closing of switch 109 causes relay winding 111 to be energized, closing contacts 112 and 113 and opening contacts 114. Closing of contacts 113 causes indicator lamp 115 to be energized, while opening of contacts 114 deenergizes an indicator lamp 116. Closing of contacts 112 completes a circuit portion including the series combination of those contacts, a set of normally closed contacts 117 and the power terminals 118 of reciprocating pump 39, FIG. 1. Connected in parallel with pump 39 is the actuating winding 119 of a relay having normally open contacts 120–123. Contacts 120 are connected in parallel with contacts 112 so that, once energized by closing of contacts 112, winding 119 remains energized so long as contacts 117 remain in their normally closed condition.

Closing of contacts 121 completes a circuit portion comprising normally closed relay contacts 124 and the actuating winding 125 of valve 15, thus causing normally closed valve 15 to open. The series combination of two sets of normally open relay contacts 126, 127 is connected in parallel with contacts 124 so that winding 125 remains energized so long as contacts 121 are held closed by winding 119 and either contacts 124 or both contacts 126, 127 are held closed.

Normally closed contacts 124 are arranged to be opened when a relay winding 128 is energized, that winding being connected in series with the contacts of liquid level sensing probe 100 so that energization of winding 128 occurs only when the desired amount of liquid is present in vessel 2. Winding 128 also operates normally open contacts 129, connected in series with an indicator lamp 130, and normally closed contacts 131, connected in series with an indicator lamp 132. Hence, if liquid present in vessel 2 is inadequate, so that the contacts of level sensing probe 100 are not bridged by liquid, lamp 132 will be energized but, once the liquid level has reached the contacts of probe 100, and winding 128 has thus been energized, resultant opening of contacts 131 deactivates lamp 132 while closing of contacts 129 energizes lamp 130.

Closing of contacts 122 as a result of energization of winding 119 is effective to complete a circuit portion to energize the motor 133 of an interval timer having normally open switch contacts 134, but such energization of motor 133 cannot occur unless the normally open contacts 135 of pressure sensing device 35 have been closed in response to occurrence of a predetermined low pressure in conduit 33. With contacts 122, 135 closed and motor 133 energized, indicator lamp 136 is energized and will remain energized for the interval for which the time has been set. The timer driven by motor 133 is constructed and arranged to close contacts 134 at the end of the preset time interval. Closing of contacts 134 completes a circuit portion through the series combination of those contacts and contacts 122 to energize actuating winding 137 of a relay including the normally open contacts 126, normally open contacts 138 and normally open contacts 139. Closing of contacts 138 shunts contacts 134, so that relay winding 137 remains energized so long as contacts 122 remain closed. As indicator lamp 142 is connected in parallel with winding 137 so as to be energized whenever that winding is energized.

Closing of contacts 139 as a result of energizing relay winding 137 completes six parallel circuit portions in which are respectively connected actuating winding 141 of normally closed valve 42, actuating winding 142 of normally open valve 40, actuating winding 143 of normally closed valve 54, actuating winding 144 of normally closed valve 45, actuating winding 145 of normally open valve 41, and actuating winding 146 of normally open valve 56.

Connected in series with contacts 123 are the normally open contacts 147 of pressure sensor 52 and the motor 148 of an interval timer having normally open contacts 149. An indicator lamp 150 is connected in parallel with motor 148 so as to be energized whenever contacts 147 are held closed. Contacts 149 are connected in a circuit portion in series with winding 151 of a relay having normally open contacts 127, 152 and 153. The timer driven by motor 148 is constructed and arranged to close timer contacts 149 when the interval for which the timer has been set has been completed. Since closing of timer contacts 149 completes the circuit portion necessary to energize winding 151, contacts 127, 152 and 153 are closed simultaneously as a result of closing contacts 149, i.e., at the end of the time interval determined by operation of timer motor 148. Contacts 152 are connected in parallel with timer contacts 149 so that, once contacts 149 close to initially energize winding 151, that winding is thereafter maintained energized via contacts 152. An indicator lamp 154 is connected in parallel with winding 151 so as to be energized whenever that winding is energized. Contacts 153 are connected in series with the normally open contacts 155 of pressure sensor 53 in a circuit portion for energizing relay winding 156 whenever both contacts 153 and 155 are closed. The relay of winding 156 operates normally closed contacts 117 and normally open contacts 157. Contacts 157 are connected in series with the motor 158 of an interval timer having normally closed contacts 159, the timer being operative to open contacts 159 at the end of the interval for which the timer has been set. The combination of contacts 157, contacts 159 and the centrifuge motor 102 is connected in series, so that motor 102 is energized to drive shaft 72 only when both contacts 157 and contacts 159 are closed. An indicator lamp 160 is connected in parallel with motor 102 so as to be energized whenever the motor is running. A manual on-off switch 161 is connected between contacts 159 and motor 102. In order to assure that motor 102 cannot be operated again after a first cycle of operation of the centrifuge without knowledge that the first cycle has occurred, an additional indicator lamp 162 is provided, connected to be energized via contacts 163, normally open, of a relay having actuating winding 164 and a second set of normally open contacts 165. The interval timer driven by motor 158 has a second set of contacts 166 which are normally open but closed by operation of the timer at the end of the timing operation. Winding 164 and contacts 166 are connected in series so that winding 164 is energized, causing contacts 163, 165 to close, when contacts 166 first close. Contacts 165 are connected in parallel with contacts 166 so that, once winding 164 has been energized by closing of contacts 166, winding 164 then is held energized via contacts 165. Accordingly, lamp 162 is energized as a result of completion of the time interval determined by operation of motor 158, and lamp 162 then remains energized until manual switch 109 is opened.

In use of the apparatus for treatment of, the liquid treating medium is mixed in vessel 1 and manual switches 106, 108 are closed to cause continuous operation of circulating pump 5 and the refrigeration unit. The quantity of foodstuff to be treated is placed in baskets 77, 78, the baskets installed in vessel 2, and cover 27 installed and sealed. Manual switch 109 is closed and, the liquid in tank 1 having been cooled to the predetermined temperature, closing of temperature responsive switch 110 causes relay winding 111 to be energized. As a result of energizing winding 111, contacts 112 are closed so that motor 118 of pump 39 commences operation and, simultaneously, relay winding 119 is energized to close contacts 121 and energize actuating winding 125 of valve 15, opening that valve. Since valves 40, 41 and 56 are normally open and valves 42, 45 and 54 normally closed, operation of pump 39 is in the vacuum pump mode, decreasing the pressure in vessel 2. Accordingly, opening of valve 15 results in flow of liquid from tank 1 via conduits 13 and 14, valve 15 and conduit 16 into vessel 2, such flow occurring because tank 1 is at atmospheric pressure and vessel 2 is at subatmospheric pressure. Flow of liquid into vessel 2 continues until baskets 77, 78 are completely immersed and the liquid level rises to the location of sensing probe 100. When the liquid reaches the contact of probe 100, relay winding 128 is energized and contacts 124 opened (contacts 126, 127 also occupying their normal open positions) so that winding 125 of valve 15 is deenergized, valve 15 returns to its normally closed condition, and flow of liquid into vessel 2 ceases. Pump 5 and the refrigerator continue to function, so that liquid remaining in tank 1 continues to be cooled. Since contacts 117 and 120 remain closed, pump 39 continues to operate, and with valves 40, 41 remaining open and valve 42, 45 and 54 remaining closed, that operation continues to be in the vacuum mode.

When the pressure in vessel 2, as reflected by the pressure in duct 33, reaches a desired low value, whether before or after the desired liquid level has been achieved in vessel 2, pressure sensor 35 closes its contacts 135, causing the interval timer driven by motor 133 to commence timing its preset interval, at the end of which closing of timer contacts 134 causes relay winding 137 to be energized so that contacts 139 close and the actuating windings 141-146 of valves 40-42, 45, 54 and 56 are energized. Hence, valves 40, 41 and 56 now close while valves 42, 45 and 54 open, terminating the vacuum cycle and converting pump 39 to its compression mode, so that air is delivered into vessel 2 and the pressure in the vessel, and thus the pressure applied to the treating liquid and the foodstuff immersed therein, increases. It is thus seen that sensor 35, the timer driven by motor 133 and the associated relays serve to determine the period of time during which the foodstuff is subjected to a predetermined subatmospheric pressure for degassing, and also serve to automatically commence pressurizing of vessel 2 at the end of that time period.

When the pressure in chamber 2, as reflected by that in conduit 49, reaches a predetermined value at least equal to atmospheric pressure, sensor 52 closes its contacts 147, and with winding 119 still energized to hold contacts 123 closed, motor 148 for the pressure interval timer is energized and runs through the time interval for which that timer has been set. At the end of that time interval, the timer closes its contacts 149, energizing relay winding 151 to cause contacts 127, 152 and 153 to close. Since relay winding 137 remains energized, contacts 126 remain closed. Hence, energization of winding 151, by closing contacts 127, completes the circuit to winding 125 of valve 15 via the series combination of contacts 121, 126 and 127, and valve 15 is thus actuated to its open position at the end of the pressure cycle.

When foodstuffs of particularly strong cell structure are being treated, as in the case of freeze dried red meats such as beef, pork and lamb, the pressure established in vessel 2 by the pressurization cycle can be relatively high, e.g., 15–20 p.s.i. gauge. However, when the foodstuff being treated has a relatively fragile cell structure, as in the case of freeze dried shrimp, I have found it to be advantageous to use only relatively low pressures, ranging from atmospheric pressure to not more than 5 p.s.i. gauge. When the pressure established in vessel 2 by the pressurization cycle is significantly above atmospheric pressure and recognizing that vessel 1 is at only atmospheric pressure, it is advantageous to allow the treating liquid to return from vessel 2 to vessel 1 under the influence of the pressure differential between vessel 2 and tank 1.

Pressure sensor 53 is adjusted to respond to a low, e.g., atmospheric, pressure and therefore functions to close its contacts 155 when all of the liquid in vessel 2 has been returned to tank 1. Since relay winding 151 remains energized, closing of pressure sensor contacts 155 completes the circuit to energize relay winding 156, thus causing contacts 117 to open, so that pump 39 is deactivated, and contacts 157 to close, so that centrifuge motor 102 is energized via contacts 157, timer contacts 159 and manual switch 161 and continues to operate until the end of the time interval for which the timer driven by motor 158 occurs. At that point, the timer opens contacts 159, deenergizing motor 102, and also closes contacts 166, energizing relay winding 164 to close contacts 163, 165 so that indicator lamp 162 is energized and maintained energized. Since centrifuge motor 102 has not stopped and pump 39 has been stopped, cover 27 can be removed from vessel 2 and the treated product recovered by removing baskets 77, 78. The treatment cycle can then be repeated with a fresh quantity of foodstuff.

Considering application of the method to a wide range of foodstuffs, varying for instance from relatively fragile freeze dried shrimp to relatively strong freeze dried red meat, evacuation of the treating zone provided by vessel 2 can be such as to lower the pressure at least 20 in. Hg, and advantageously to a pressure as low as 24 in. Hg or lower, that reduced pressure being established before the dried foodstuff is immersed in the rehydration liquid and continued for from 30 seconds to 2 minutes after the level of rehydration liquid in chamber 2 reaches probe 100, to effect de-gassing of the foodstuff. It is to be noted that this de-gassing step commences at a time when the foodstuff is not in contact with the treating liquid, continues through the time required to admit the treating liquid to chamber 2, and then persists for at least 30 seconds after the foodstuff has become completely immersed in the treating liquid. When the degassing period is complete, the period of positive pressurization can be maintained for from 30 seconds to a few minutes, depending upon how great a pressure is maintained and upon the strength of the product being treated. In general, the stronger the footstuff, the higher is the allowable positive pressure and the longer the time of pressurization. The treating liquid should be kept at a temperature of 32.5°–90° F. at all times, with temperature in the range of 35°–50° F. giving good results and temperatures in the range of 38°–41° F. being best. The treating medium can be deionized water, with additives as required, and the pH is advantageously maintained in the range of 3–5.5. The total time of immersion in the liquid can be 2–40 min., with 3–8 min. being optimum for rehydration of dried shrimp. For most purposes, the volume ratio of treating liquid to foodstuff being treated should be at least 1:1.

What is claimed is:

1. In an apparatus for batch treatment of foodstuffs with a liquid, the combination of a holding tank for the liquid;

refrigeration means operatively associated with the holding tank for maintaining liquid in the holding tank within a desired temperature range;

a sealed treating chamber in which a quantity of foodstuff can be supported for treatment and withdrawn after treatment;

first conduit means connected between said holding tank and said treating chamber via which liquid can be delivered from the holding tank to the treating chamber and returned from the treating chamber to the holding tank;

pump means capable of operating in a vacuum pump mode and a compressor mode;

second conduit means connected between said pump means and said treating chamber whereby said pump means when operated in its vacuum pump mode can operate to evacuate air from said treating chamber;

third conduit means connected between said pump means and said treating chamber via which said pump means when operated in its compressor mode can pressurize said treating chamber;

first valve means connected to control liquid flow in said first conduit means;

second valve means connected to control air flow in said second conduit means;

third valve means connected to control air flow in said third conduit means; and automatic control means connected to operate said pump means and said valve means to accomplish a first cycle of operation in which said treating chamber is evacuated and liquid therefore flows from said holding tank into said treating chamber under the influence of the pressure differential between the holding tank and the evacuated treating chamber and the treating chamber is then held under subatmospheric pressure; a second cycle in which said pump means pressurizes said treating chamber and a positive pressure is then maintained in said treating chamber; and a third cycle in which liquid flows from said treating chamber under the influence of said positive pressure.

2. The combination defined in claim 1, and further comprising:

centrifuge means including
support means for treated foodstuff, and
power means for rotating said support means; said control means including connected to said power means operative to accomplish a fourth cycle of operation in which said power means is operated to rotate said support means to cause free liquid to be removed from the foodstuff centrifugally.

3. The combination defined in claim 2, wherein said support means of said centrifuge means is located within said treating chamber.

4. The combination defined in claim 1, wherein said automatic control means is constructed and arranged to accomplish said third cycle by operating said first valve means, whereby the liquid removed from said treating chamber returns to said holding tank via said first conduit means.

5. The combination defined in claim 1, wherein said control means further comprises:

first timing means,
first pressure responsive means connected to respond to occurrence of a predetermined subatmospheric pressure in said treating chamber, and means controlled by said first pressure responsive means for operating said first timing means to determine the time period during which said treating chamber is held under subatmospheric pressure in said first cycle of operation.

6. The combination defined in claim 5, wherein said control means further comprises:

second timing means, second pressure responsive means connected to respond to a predetermined positive pressure in said treating chamber, and means controlled by said second pressure responsive means for operating said second timing means to determine the time period during which said treating chamber is held under positive pressure in said second cycle of operation.

7. The combination defined in claim 1, wherein said control means further comprises:

level sensing means responsive to the level of liquid in said treating chamber, and means for operating said first valve means to prevent flow of liquid via said first conduit means in response to detection by said level sensing means of a predetermined level of liquid in said treating chamber.

8. The combination defined in claim 1, wherein said refrigeration means comprises:

a pump, a heat exchanger, and fourth conduit means connecting the series combination of said pump and said heat exchanger to said holding tank, the combination further comprising:

a valve-controlled discharge conduit connected to said fourth conduit means between said pump and said heat exchanger, whereby liquid returned from said treating chamber to said holding tank can be discharged to waste via said discharge conduit.

* * * * *